Patented July 30, 1935

2,009,754

UNITED STATES PATENT OFFICE 2,009,754

PROCESS FOR PURIFICATION OF POTABLE AND POLLUTED WATERS

Oliver M. Urbain and William R. Stemen, Columbus, Ohio, assignors to Charles H. Lewis, Harpster, Ohio No Drawing. Application October 27, 1934, Serial No. 750,388

7 Claims. (Cl. 210—23)

The process of the present invention relates to the purification of both potable and polluted waters. By potable waters is meant water which is being purified for domestic consumption by the inhabitants of a community.

In the purification of potable water three factors are of prime importance, namely, first, sanitary quality, i. e., content of bacteria, second, tastes and odors, and third, hardness.

The tastes and odors in potable water are due to the presence in the water of organic compounds which have their origin in decomposing organic matter or the passage of industrial wastes into the original watershed. Bacteria, algae, amœba and many other forms of animal and vegetable life are responsible for the tastes and odors due to the composition of organic matter which we find in our potable water supplies. Many public water supplies are also contaminated with phenols. Such is the case in many cities located on the Ohio River and the Great Lakes. Even a few hundredths of 1.0 p. p. m. of phenols will result in a bad taste and odor in the finished water which has been chlorinated. These tastes and odors are due in large part to chlorophenols and chlorocresols.

For the purposes of removing tastes and odors in potable water supplies, activated carbons are now employed. The powdered carbon is added to the water before coagulation, and, after its action is complete, is coagulated from the water with aluminum sulfate and like coagulants. The activated carbons used for this purpose are quite expensive and constitute an important item in the final costs of purification.

The present invention contemplates the use of a material which is not only much less expensive but which also will remove considerably more of the taste and odor producing compounds per unit of weight, and accomplish this result in less time than the activated carbons now employed for the purpose. It is more efficient for the purpose from any angle which may be considered.

In the purification of polluted water as distinguished from potable water, the requirements are quite different. In this case the problem involved is one applied to the removal of organic compounds which are in true solution, and which are responsible for the B. O. D. (biochemical oxygen demand) of a polluted water after the suspended matter and the colloidal matter has been removed. This B. O. D. varies greatly for the different wastes. The B. O. D. of a few representative polluted liquids, after the removal of the suspended and colloidal matter, are given as follows:—

| Waste | 10-day B. O. D. 20° C. |
|---|---|
| Dilute sewage | 32 |
| Strawboard waste | 370 |
| Tannery waste | 340 |
| Creamery waste | 220 |
| Concentrated sewage | 110 |
| Packing house waste | 2200 |

The elimination of the B. O. D. of the true solution fraction of the various wastes is a problem of considerable magnitude. It is to the solution of this problem in the field of polluted liquids and to the problem of eliminating the tastes and odors from potable water supplies that the present invention is directed. The applications of the process are somewhat different, that is, the process is varied to meet varying conditions.

The material employed in the process consists of aminated chlorinated coal. The constituents of the material which actually do the work are the aminated chlorine derivatives of coal, and their derivatives. Therefore, when the words "aminated chlorinated coal" are used in this specification and the claims, it will be understood that they are inclusive of the "aminated chlorine derivatives of coal, and their derivatives."

In the preparation of the base material we employ powdered coal such as sub-bituminous, bituminous or anthracite coal, powdered to pass through a 5 mesh to 20 mesh screen. The coal is chlorinated at a temperature varying from room temperature to 125° C. by passing chlorine gas through the mass. Above 125° the chlorine compounds decompose, so care should be taken to keep the temperature below this critical point. In this chlorination process, catalysts such as iron, iodine, sulfur or lead may to advantage be employed, though their use is not essential. The temperature of the coal mass rises somewhat during chlorination. Hydrochloric acid gas and water vapor are copiously given off. Smaller quantities of carbon oxides, hydrocarbons and chlorinated hydrocarbons are given off.

The product of such chlorination contains substantial amounts of chlorine by weight. The percentage of chlorine depends upon the following factors:—

1. Fineness of the coal
2. Nature or kind of coal
3. Temperature of chlorination
4. Pressure
5. Time of chlorination The finer the coal, the higher the temperature up to 125° C., the higher the pressure, and the longer the time of contact to complete chlorination, the higher will be the percentage of chlorine in the finished product. The chlorinated coal is more porous than the original coal, therefore it has a greater surface exposure. The fragility of the chlorinated coal is not appreciably different from that of the original coal when hard coals are employed. When soft coals are employed, the chlorinated product is much harder than the original coal. The chlorination should be carried out in an apparatus made of materials capable of withstanding the action of hydrochloric acid.

The action of the chlorine on the coal may be expressed by the following factors:

1. Chlorine substitutes for hydrogen in the hydrocarbon part of the so-called coal conglomerate.
2. Chlorine oxidizes certain groupings and opens up the ring structures.
3. Chlorine adds to the unsaturated points in the coal.
4. Chlorine adds to the unsaturated points made under #2.
5. Chlorine renders soluble the inactive inorganic constituents (coal ash) of the coal, such as iron and its compounds, sulfur and the alkaline earth metal compounds, which, upon removal by washing, open up the coal structure, increasing the active surface of the mass.
6. Chlorine activates the surface of the mass by shifting the adsorbed and absorbed gases.

By aminating the chlorinated coal we are able to increase its activity towards certain groups of organic compounds. The amination is effected by treating the chlorinated coal with ammonia, or with any of the amines, or a mixture of both. The amination may be accomplished by treating the chlorinated coal with the aqueous reagents or the reagents in gaseous form. The amination will proceed at greater speed when cuprous chloride is employed as a catalyst but the use of a catalyst is not necessary for complete amination. Higher pressure and higher temperatures speed up the amination reactions. The aminated material, after exhaustion, may be regenerated by back washing with a solution of any of the hydroxides of the alkali metals or the alkaline earth metals.

The aminated material is especially active in removing organic acids, aldehydes, ketones, mercaptans and the phenols.

This material is then especially adapted for use in treating the wastes from coke oven industries and kindred works, since the aminated chlorinated coal product is especially adapted for removing phenols and chlorophenols from water. Only a few minutes' contact, ordinarily not exceeding 15 or 20 minutes, is necessary for complete removal of such compounds.

In the treatment of water, the mode of application may be by a filter arrangement or by adding the material in a finely powdered condition directly to the water to be treated, followed by adequate agitation and subsequent coagulation. If used as a filter, the particle size of the material should be from 5 mesh to 10 mesh; if added directly to the water the fineness may be such that the particle will pass through a 40 mesh screen.

By using aminated chlorinated coal as a filter material, one not only obtains a splendid mechanical filter but an extremely active chemical filter as well.

The mechanism of the removal of the organic compounds by chlorinated coal, are as follows:

1. Sorption
2. Metathesis
3. Addition (chemical)

When used as a filter a time period of contact of approximately 20 minutes will be found adequate. The filter may constitute the last step in a complete purification treatment. The size of the filter is of no importance so long as a suitable time period of contact is provided for.

When used in the powdered form, the aminated chlorinated coal is added just ahead of the coagulation step and given approximately 15 minutes of agitation. When used in potable water purification, the aminated chlorinated coal is added before or during the coagulation step and agitated for about fifteen (15) minutes.

We have effectively removed tastes and odors from potable water and also substantially eliminated the B. O. D. of the true solution fraction of organic matter present in a polluted water by treatment with aminated chlorinated coal in accordance with the described process.

Having thus described our invention, what we claim is:—

1. In a process for the treatment of potable and polluted water, the step of subjecting the water to the action of aminated chlorinated coal.

2. In a process for the treatment of potable and polluted waters, the step of subjecting the water to the action of aminated chlorine derivatives of coal.

3. A process for the purification of potable waters to remove objectionable tastes and odors comprising treating the potable water with aminated chlorine derivatives of coal.

4. A process for removing phenols, cresols, chlorocresols, and chlorophenols from potable water supplies comprising subjecting the water for a time period not substantially in excess of 20 minutes to the action of aminated chlorinated coal.

5. A process for removing phenols, cresols, chlorocresols, and chlorophenols from potable water supplies comprising subjecting the water for a time period not substantially in excess of 20 minutes to the action of aminated chlorine derivatives of coal.

6. In a process for the purification of water, the step of removing organic materials in solution in the water by passing the water through a filter composed of aminated chlorinated coal.

7. In a process for the purification of water, the step of removing organic materials in solution in the water by passing the water through a filter containing aminated chlorine derivatives of coal.

OLIVER M. URBAIN.
WILLIAM R. STEMEN.